United States Patent [19]
Elangovan et al.

[11] Patent Number: 6,099,985
[45] Date of Patent: Aug. 8, 2000

[54] SOFC ANODE FOR ENHANCED PERFORMANCE STABILITY AND METHOD FOR MANUFACTURING SAME

[75] Inventors: Singaravelu Elangovan, Sandy; Ashok C. Khandkar, Salt Lake City, both of Utah

[73] Assignee: Gas Research Institute, Chicago, Ill.

[21] Appl. No.: 08/888,025

[22] Filed: Jul. 3, 1997

Related U.S. Application Data

[60] Provisional application No. 60/021,282, Jul. 5, 1996.

[51] Int. Cl.$^7$ ............................. H01M 4/86; H01M 4/88
[52] U.S. Cl. ............................. 429/44; 429/45; 502/101
[58] Field of Search ........................ 429/44, 45; 502/101

[56] References Cited

U.S. PATENT DOCUMENTS

| | | | |
|---|---|---|---|
| 3,503,809 | 3/1970 | Spacil | 136/86 |
| 3,505,120 | 4/1970 | Cole | 136/86 |
| 3,578,502 | 5/1971 | Tannenberger et al. | 136/120 |
| 4,317,865 | 3/1982 | Trocciola et al. | 429/41 |
| 4,459,341 | 7/1984 | Marchant et al. | 429/33 |
| 4,582,766 | 4/1986 | Isenberg et al. | 429/30 |
| 4,702,971 | 10/1987 | Isenberg | 429/31 |
| 4,767,518 | 8/1988 | Maskalick | 204/242 |
| 4,849,254 | 7/1989 | Spengler et al. | 427/115 |
| 4,943,496 | 7/1990 | Okada et al. | 429/45 |
| 5,021,304 | 6/1991 | Ruka et al. | 429/30 |
| 5,035,962 | 7/1991 | Jensen | 429/40 |
| 5,053,379 | 10/1991 | Giordano et al. | 502/328 |
| 5,217,822 | 6/1993 | Yoshida et al. | 429/33 |
| 5,261,944 | 11/1993 | Lockhart et al. | 75/628 |
| 5,350,641 | 9/1994 | Mogensen et al. | 429/30 |
| 5,368,951 | 11/1994 | Shiratori et al. | 429/30 |
| 5,470,672 | 11/1995 | Naoumidis | 429/40 |
| 5,474,800 | 12/1995 | Matsuzaki | 427/115 |
| 5,500,307 | 3/1996 | Anzai et al. | 429/30 |
| 5,591,548 | 1/1997 | Mao | 429/218 |
| 5,783,333 | 7/1998 | Mayer | 429/223 |

FOREIGN PATENT DOCUMENTS

10003930 A2  1/1998  Japan .............................. H01M 4/88

OTHER PUBLICATIONS

Microstructure and Long–Term Stability on Ni–YSZ Anode, *Electrochemical Proceedings*, vol. 97–18 (97–40), pp. 815–831, Jun. 1997.

Improved Initial Stabillity of SOFC Anode by Microstructural Optimization, *Electrochemical Proceedings*, vol. 97–18 (97–40), pp. 850–867, Jun. 1997.

"JFCC Rev." (1991) 3 pp. 19–26, Fukui et al., "Effect of YSZ Addition to Solid Oxide Fuel Cell Electrode on Electrical Perfprmanace".

Kiyoshi Okumura et al., "Microstructure and Overvoltage Characteristics of the Anode for Solid Oxide Fuel Cells" *The Electromechanical Society, Inc.*, vol. 93–4, pp. 444–453 (1993). No Month.

Radenka Maric et al., "High–Performance Ni–SDC Cermet Anode for Solid Oxide Fuel Cells at Medium Operating Temperature", *Electromechanical and Solid–State Letters, The Electromechanical Society, Inc.*, pp. 201–203 (1998). No Month.

*Primary Examiner*—Maria Nuzzolillo
*Assistant Examiner*—Tracy Dove
*Attorney, Agent, or Firm*—Pauley Petersen Kinne & Fejer

[57] ABSTRACT

An SOFC anode is provided, which is fabricated from ceria which has been mixed with a nickel oxide-magnesium oxide material to stabilize the nickel against coarsening during high temperature SOFC operation. With a starting material of NiO—MgO solid solution in a cement anode, the MgO will diffuse into zirconia and/or ceria at the appropriate firing temperature for the respective materials. Reduction of NiO in the anode with the fuel during cell operation will result in metallic Ni grains with a fine dispersion of MgO. The dispersion of MgO in Ni retards coarsening of nickel during the high temperature operation of the cell.

10 Claims, 3 Drawing Sheets

SCHEMATIC OF SOFC ANODE

SOFC ANODE FOR ENHANCED PERFORMANCE STABILITY AND METHOD FOR MANUFACTURING SAME

This non-provisional patent application claims priority, based upon 35 U.S.C. §119(e), of Ser. No. 60/021,282, filed Jul. 5, 1996.

BACKGROUND OF THE INVENTION

1. The Technical Field

The present invention relates to solid oxide fuel cells (SOFCs), and the structures and materials by which they are constructed. In particular, the present invention concerns anode structures for solid oxide fuel cells.

2. Solid oxide fuel cells are recognized as having the potential to mitigate environmental problems while meeting the power generation and cogeneration needs of tomorrow. Present work in SOFCs is centered on the use of zirconia electrolytes operating at high temperatures between 900–1000° C. These high temperatures present special challenges related to materials degradation.

The high temperature is particularly challenging to anode stability. Metallic nickel phase appears to be by far the best anode material for fuel oxidation. It is also preferred for hydrocarbon fuel since nickel is a good catalyst for hydrocarbon reformation. The primary drawback in using a nickel anode is that a nickel anode will typically have a high thermal expansion coefficient, on the order of $13 \times 10^{-6}$ cm/cm/C, compared to the commonly used electrolyte material, zirconia, which has a thermal expansion coefficient of 10 to $11 \times 10^{-6}$ cm/cm/C. Furthermore, metallic nickel exhibits poor wetting characteristics on zirconia. Both these issues promote coarsening of nickel particles leading to eventual loss of both physical contiguity (which lowers electrical conductivity) and reaction interface area (which slows electrode kinetics).

To mitigate some of these issues a mixture of nickel and zirconia (30 to 50 percent zirconia by volume has been used as the anode to provide a closer thermal expansion between the anode and the electrolyte, as well to increase the three phase boundary (where the gas phase-ionic conductor [zirconia] and electronic conductor [nickel] meet). Although the bulk thermal expansion of the anode and electrolyte, respectively, may be closer, at the microstructural level, the thermal expansion mismatch between individual nickel and zirconia grains does still exist.

Additionally, the typical fabrication processes used to apply the anode to the electrolyte, such as screen printing, plasma spraying or slurry coating of the anode (mixture of nickel oxide and zirconia) onto a densified zirconia substrate and sintering the anode are unlikely to provide a contiguous zirconia structure to provide an enhancement in the three phase boundary area. A high sintering temperature, 1400 to 1500° C., helps in providing the necessary sintering of zirconia particles in the anode mixture to accomplish a contiguous structure. However, the thermal expansion mismatch typically warps the substrate at those sintering temperatures. In addition, the nickel particles in the nickel-zirconia mixture still coarsen over time resulting in cell performance degradation.

The ideal anode microstructure has sufficient open porosity for reactant access from the bulk fuel gas to the electrolyte-anode interface and removal of product species from the interface; and a mechanically stable microstructure to maintain continuity, preferably of both electronic and ionic conducting phases and a well adhered microstructural interface. It is thus necessary to reduce the coarsening rate of the nickel particles to improve stability of cells. It is also necessary to promote the wettability of (or adhesion of) the Ni on to the zirconia substrate.

SUMMARY OF THE INVENTION

This invention relates to a method and composition of an anode for a solid oxide fuel cell, in which the principal conductive metal of the anode is substantially stabilized against coarsening using a dopant scheme. Oxide dispersion approaches have been shown to retard Ni anodes from coarsening. Chromia dispersion is used in Molten Carbonate Fuel Cell (MCFC) nickel anodes for microstructural stability.

The present invention uses MgO dispersion to achieve enhanced anode stability. MgO has been found to have the unique property to form solid solutions with all three of the materials of interest, the three materials being nickel oxide, ceria, and zirconia. MgO forms a complete solid solution (forms a single phase from 0 to 100% MgO) with NiO and shows limited solubility in zirconia and ceria. MgO can be added as a dopant to both zirconia and ceria to stabilize their cubic crystal structure and thereby improve their ionic conductivities.

With a starting material of NiO—MgO solid solution in a cermet anode, the MgO will diffuse into zirconia and/or ceria at the appropriate firing temperature for the respective materials. This surface diffusion will enhance the physico-chemical bonding at the interface without any adverse effect on the electrical properties. Reduction of the NiO in the anode with the fuel, typically hydrogen containing gas, during cell operation will result in metallic Ni grains with a fine dispersion of MgO. The dispersion of MgO in Ni retards coarsening of nickel during the high temperature operation of the cell. The diffusion of MgO into zirconia and/or ceria provides an anchoring effect of the nickel particles onto the ceramic in the anode structure as well as the electrolyte and retards against de-wetting of Ni particles.

The addition of ceria provides an additional benefit. At the fuel gas conditions, the ceria partially reduces, from $CeO_2$ to $Ce_2O_3$, thus developing electronic conductivity in addition to its ionic conductivity, thereby vastly increasing the three phase boundary as mentioned earlier.

The present invention comprises, in part, an anode, for use in a solid oxide fuel cell. An anode layer is disposed upon an electrolyte substrate, and fabricated, at least in part, from a first component containing particles of a first metal. The anode layer further contains a second component, containing at least a second metal, in an amount relative to the amount of particles of the first metal, effective to substantially preclude coarsening of the particles composed of the first metal, as a result of operation of the solid oxide fuel cell.

The electrolyte substrate may be fabricated at least in part from at least one material from the group consisting of zirconia, ceria.

The first component of the anode layer is fabricated at least in part from nickel. The second component of the anode layer is fabricated at least in part from magnesium oxide.

Preferably, the amount of magnesium oxide may be 5 to 30 mole percent relative to the nickel metal in the anode layer. The amount of nickel with magnesium oxide dispersion in the anode layer may be 30 to 60 volume percent of the total material in the anode layer. Accordingly, 70 to 40 volume percent of the total material in the anode layer is an oxygen ion conducting ceramic material.

Preferably, the anode layer is formed from a solid solution of nickel oxide and magnesium oxide, wherein the nickel oxide is chemically reduced to metallic nickel during operation of the solid oxide fuel cell.

The present invention also comprises a process for making an anode, for use in a solid oxide fuel cell.

The process includes the steps of:
forming an electrolyte substrate;
preparing a liquid precursor, for a solid solution anode layer containing a first metal and a second metal in an amount relative to the first metal effective to substantially preclude coarsening of particles of the first metal in the anode layer, when in use in a solid oxide fuel cell;
decomposing the liquid precursor;
converting the solid solution to an anode layer powder;
converting the anode layer powder to an anode suspension material;
placing the anode suspension material onto the electrolyte substrate;
curing the anode suspension material to form an anode layer.

The step of forming a liquid precursor further comprises the step of:
preparing a nitrate solution of nickel;
preparing a nitrate solution of magnesium;
mixing the nitrate solutions of nickel and magnesium to provide a preferred nickel to magnesium molar ratio of 9:1.

BEST MODE FOR CARRYING OUT THE INVENTION

Figure 1A:
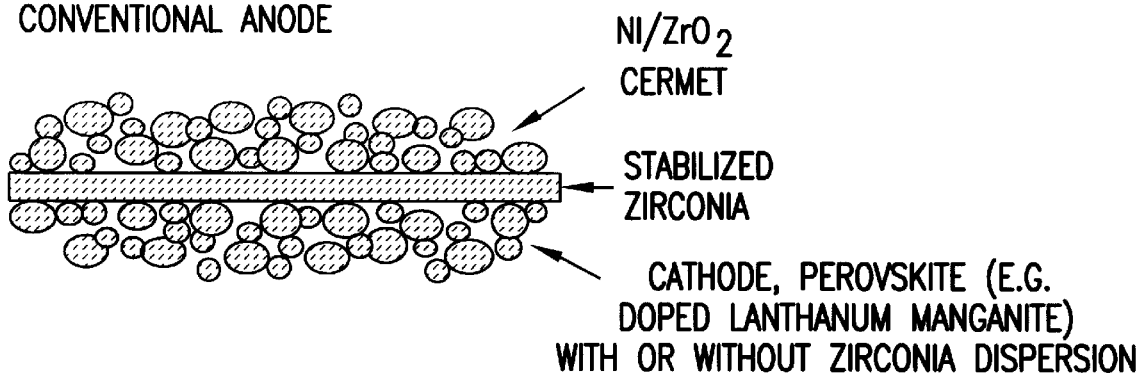
FIG. 1A schematically illustrates a conventionally constructed anode of the prior art and FIG. 1B illustrates schematically the physiochemical mechanisms present in an anode constructed in accordance with the present invention.

While this invention is susceptible of embodiment in many different forms, there are shown in the drawings and will be described herein in detail, several embodiments with the understanding that the present disclosure is intended to be considered as an exemplification of the principles of the invention and is not intended to limit the invention to the embodiments illustrated.

Figure 1B:
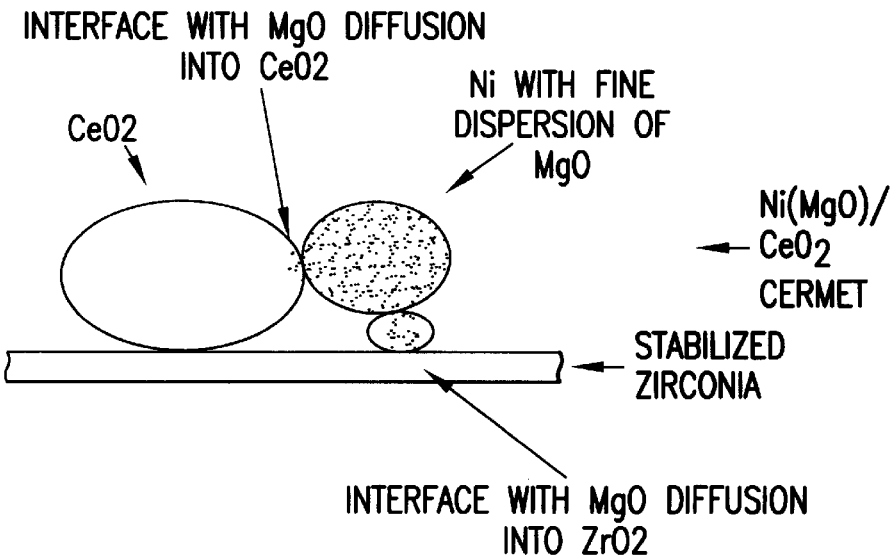

FIG. 1B shows schematically the physicochemical mechanisms present in an anode constructed in accordance with the present invention. A stabilized (e.g., yttria-doped) zirconia electrolyte has an anodic layer formed by Ni(MgO)/$CeO_2$ cermet.

The method of manufacturing an anode for a solid oxide fuel cell, in accordance with the principles of the present invention is as follows. Tape-cast 8 mole % yttria-doped zirconia was used as the electrolyte. The typical thickness of the electrolyte was about 170 microns.

An actual anode was prepared as follows: a liquid precursor technique, as taught by Pechini was used to synthesize a solid solution of NiO and MgO. Nitrate solutions of nickel and magnesium were mixed to provide a Ni to Mg molar ratio of 9:1. Specifically, powders of the desired composition were synthesized using an organic polymer Pechini-type process (Pechini, U.S. Pat. No. 3,330,697). Nitrate precursors were combined in the proper stoichiometric ratios with citric acid and ethylene glycol in sufficient amounts. The resultant material was then thermally decomposed and polymerized at approximately 150° C., according to known techniques. The resulting char was de-agglomerated by ball milling, calcined at 900° C. for 8 hours, and remilled to achieve a final product. Calcining can be done at 900–1000° C. for 6–8 hours to achieve a similar product.

This resulted in a single phase NiO—MgO solid solution as verified by standard X-ray diffraction technique. The solid solution powder was then mixed with 10% (molar) calcia doped ceria and ball milled using an ethanol medium for 2–4 hours. The mixture was dried at 80° C. overnight to give the anode powder. Other suitable oxygen ion conducting ceramic material (e.g., zirconia) could also be mixed with the solid solution powder, instead of, or in addition to, ceria.

Figure 3:
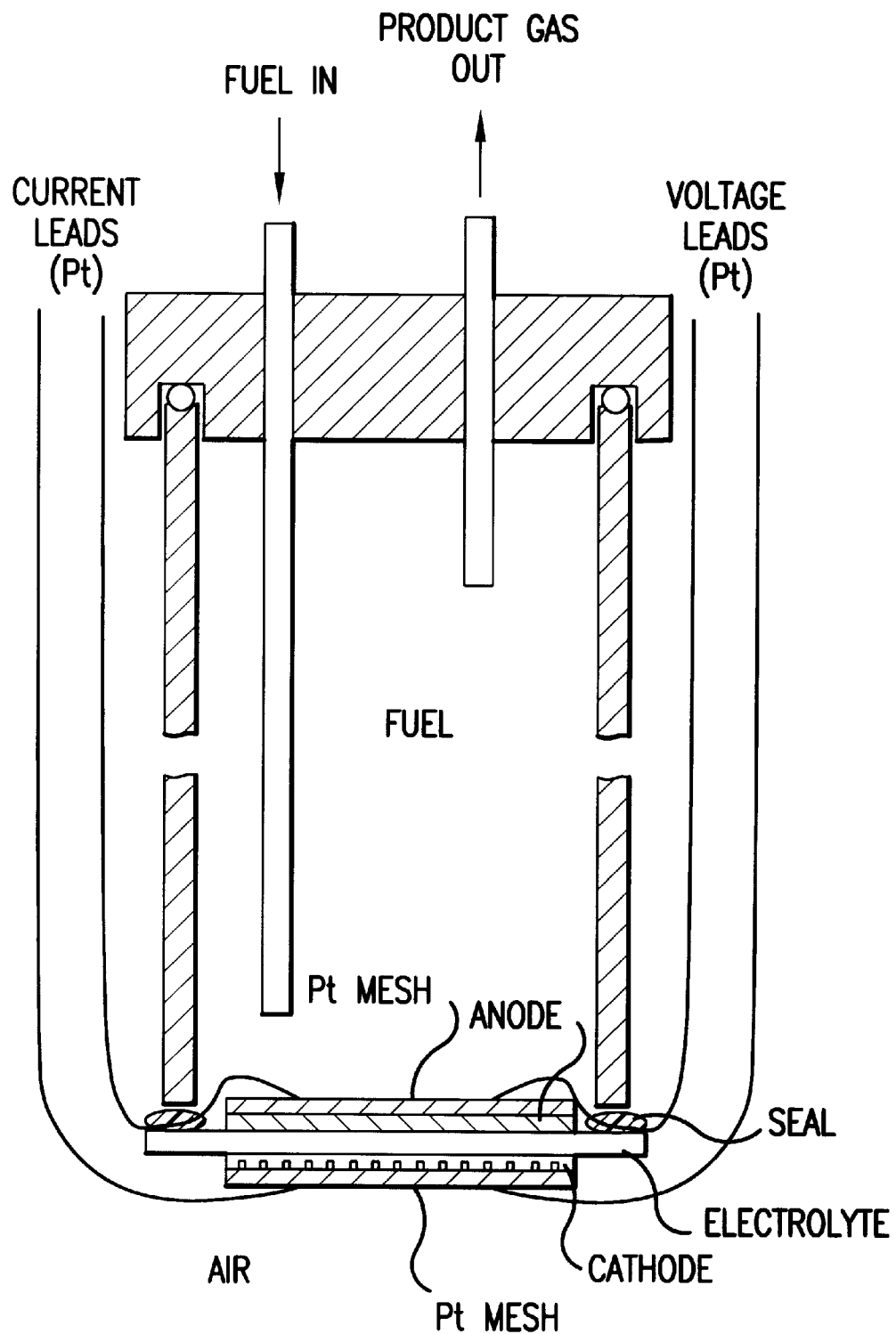
FIG. 3 illustrates a simple solid oxide fuel cell constructed in accordance with the principles of the present invention.

A slurry of the anode material was made, using known techniques, using a commercial organic binder, such as may be obtained from Heraeus Inc. of Chandler, AZ (10–15% by weight) and solvent (alpha—terpineol, 5–10% by weight) to get a screen printable ink. A similar ink of Sr doped $LaMnO_3$ was made as the cathode. To obtain the desired material, nitrates of lanthanum, strontium and manganese are mixed in the molar ratio of La:Sr=89:10 and (La+Sr) to Mn ratio of 0.99:1 to obtain a composition of $La_{0.89}Sr_{0.1}MnO_3$. The cathode powder was synthesized following the process taught by Pechini. A screen printable cathode ink was made using a binder and a solvent similar to the process for the anode ink preparation. Both the anode and the cathode were screen-printed on opposite sides of a zirconia disc of 35 mm in diameter, and the electrodes were sintered at 1200 to 1300° C. for 15 minutes to 1 hour. Pt mesh with Pt wires, were attached over the electrodes (anode and cathode) with Pt ink (a commercial ink available from Heraeus Inc.) using known techniques and fired at 1000° C. for one hour. The anode side of the disc was sealed to a zirconia tube to form a fuel manifold. The cathode side of the disc was exposed to ambient air. A silica based glass was used to seal the disc to a zirconia tube (8 mole % yttria doped zirconia) at 1100° C. The opposite end of the tube was plugged with an impervious disc with an inlet tube for fuel gas and outlet tube for the combustion products gases. FIG. 3 illustrates the simple fuel cell constructed as described.

When the anode layer is cured on the electrolyte substrate, the amount of magnesium oxide comprises 5 to 30 mole percent relative to the nickel in the anode layer. The amount of nickel in the anode layer comprises 30 to 60 volume percent of the total material in the anode layer. Accordingly, 70 to 40 volume percent of the total material in the anode layer is an oxygen ion conducting ceramic material.

The nickel anode material is deposited as nickel oxide on the electrolyte. However, during operation of the fuel cell, when exposed to the fuel gas, the nickel oxide is reduced to metallic nickel. The presence of the magnesium oxide in the anode layer helps prevent physical coarsening of the anode layer, particularly the metallic nickel particles during the reduction process, as well as during cell operation over time.

Figure 2:
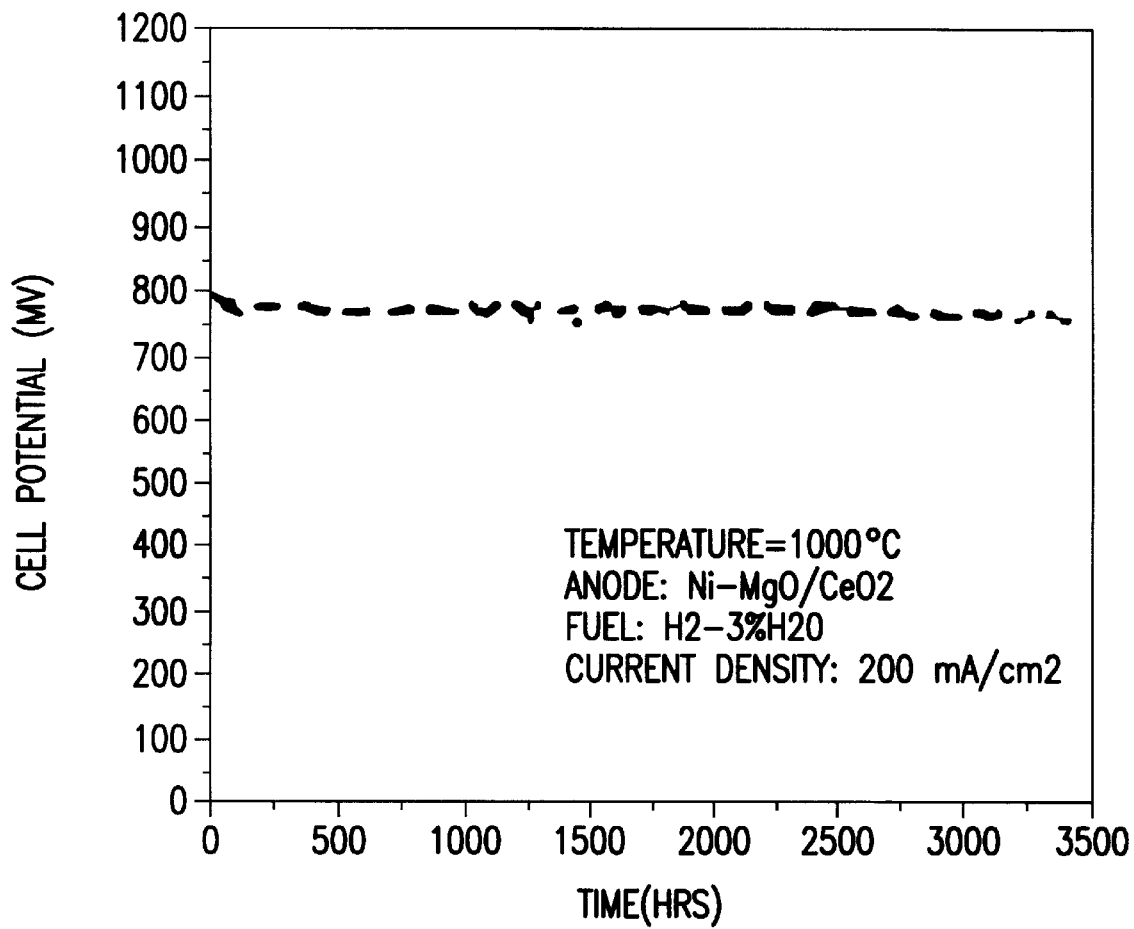
FIG. 2 illustrates the measured performance of an SOFC anode constructed in accordance with the principles of the present invention.

The cell (FIG. 3) was tested at various temperatures ranging from 800 to 1000° C. The cell was put under a load of 200 mA/$Cm^2$ at 1000° C. for long term testing. The cell performance was stable at approx. 800 mV for nearly 3,500 hours (FIG. 2) without any change in performance after which the test was terminated. This test indicates that the anode was stable even at a high operating temperature of 1000° C. with the present anode.

The foregoing description and drawings merely explain and illustrate the invention and the invention is not limited thereto except insofar as the appended claims are so limited, as those skilled in the art having the disclosure before them will be able to make modifications and variations therein without departing from the scope of the invention.

We claim:

1. A process for precluding coarsening of particles of a first metal in an anode, for use in a solid oxide fuel cell, comprising the steps of:

forming an electrolyte substrate;

preparing a liquid precursor, for a solid solution anode layer containing a first metal and a metal oxide in an amount relative to the first metal effective to substantially preclude coarsening of particles of the first metal in the anode layer, when in use in a solid oxide fuel cell;

decomposing the liquid precursor to form a solid solution containing the first metal and the metal oxide in an amount relative to the first metal effective to substantially preclude coarsening of particles of the first metal in the anode layer, when in use in a solid oxide fuel cell;

converting the solid solution to an anode layer powder;

converting the anode layer powder to an anode suspension material;

placing the anode suspension material onto the electrolyte substrate; and curing the anode suspension material to form an anode layer disposed upon the electrolyte substrate.

2. The process according to claim 1, wherein the step of forming a liquid precursor further comprises the step of:

preparing a nitrate solution of nickel;

preparing a nitrate solution of magnesium;

mixing the nitrate solutions of nickel and magnesium to provide a nickel to magnesium molar ratio of 9:1.

3. A process for precluding coarsening of particles of a first metal in an anode, for use in a solid oxide fuel cell, the process comprising:

forming an electrolyte substrate; and forming an anode layer on the electrolyte substrate, the anode layer containing at least particles of a first metal with at least a metal oxide dispersed in the first metal in an amount relative to the first metal effective to substantially preclude coarsening of the particles as a result of operation of the solid oxide fuel cell.

4. The process for making an anode, for use in a solid oxide fuel cell, according to claim 3, wherein the forming of the electrolyte substrate further comprises fabricating the electrolyte substrate at least in part from at least one material selected from the group consisting of zirconia and ceria.

5. The process for making an anode, for use in a solid oxide fuel cell, according to claim 3, wherein the first metal is nickel.

6. The process for making an anode, for use in a solid oxide fuel cell, according to claim 5, wherein the metal oxide is magnesium oxide.

7. The process for making an anode, for use in a solid oxide fuel cell, according to claim 6, wherein magnesium oxide is present in an amount of 5 to 30 mole percent relative to the nickel in the anode layer.

8. The process for making an anode, for use in a solid oxide fuel cell, according to claim 6, wherein nickel particles with magnesium oxide dispersed therein comprises 30 to 60 volume percent of the anode layer.

9. The process for making an anode, for use in a solid oxide fuel cell, according to claim 6, wherein 40 to 70 volume percent of the anode layer is an oxygen ion conducting ceramic material.

10. The process for making an anode, for use in a solid oxide fuel cell, according to claim 6, wherein the anode layer is formed from a solid solution of nickel oxide and magnesium oxide, wherein the nickel oxide is chemically reduced to metallic nickel during operation of the solid oxide fuel cell.

* * * * *

UNITED STATES PATENT AND TRADEMARK OFFICE
CERTIFICATE OF CORRECTION

PATENT NO.   : 6,099,985
DATED        : August 8, 2000
INVENTOR(S)  : Singaravelu Elangovan and Ashok C. Khandkar Page 1 of 1

It is certified that error appears in the above-identified patent and that said Letters Patent is hereby corrected as shown below:

Claim 1, column 5,
Line 18, after "fuel cell" add -- , by mixing nitrates of the first metal and the metal of the metal oxide --.

Claim 3, column 6,
Line 7, after "fuel cell" add -- , the anode layer prepared from nitrate solutions of the first metal and the metal of the metal oxide --.

Signed and Sealed this

Second Day of October, 2001

Attest:

NICHOLAS P. GODICI
Attesting Officer    Acting Director of the United States Patent and Trademark Office